United States Patent
Shi (10) Patent No.: US 10,854,859 B2
(45) Date of Patent: Dec. 1, 2020

(54) HIGH PERFORMANCE POLYAMIDE COMPOUNDS AND USES THEREOF

(71) Applicant: LYONDELLBASELL ADVANCED POLYMERS INC., Houston, TX (US)

(72) Inventor: Ying Shi, Akron, OH (US)

(73) Assignee: LYONDELLBASELL ADVANCED POLYMERS INC., Houston, TX (US)

(*) Notice: Subject to any disclaimer, the term of this patent is extended or adjusted under 35 U.S.C. 154(b) by 82 days.

(21) Appl. No.: 16/206,984

(22) Filed: Nov. 30, 2018

(65) Prior Publication Data
US 2019/0169433 A1    Jun. 6, 2019

Related U.S. Application Data

(60) Provisional application No. 62/595,000, filed on Dec. 5, 2017.

(51) Int. Cl.
*H01M 2/08* (2006.01)
*C08L 77/10* (2006.01)

(52) U.S. Cl.
CPC .............. *H01M 2/08* (2013.01); *C08L 77/10* (2013.01); *C08L 2201/08* (2013.01); *C08L 2203/20* (2013.01); *C08L 2205/24* (2013.01)

(58) Field of Classification Search
CPC combination set(s) only.
See application file for complete search history.

(56) References Cited

U.S. PATENT DOCUMENTS

| | | | |
|---|---|---|---|
| 4,429,079 A | 1/1984 | Shibata et al. | |
| 5,153,250 A * | 10/1992 | Sinclair | C08G 69/265 524/230 |
| 5,332,633 A | 7/1994 | Adamson et al. | |
| 5,364,895 A | 11/1994 | Stevenson et al. | |
| 5,462,820 A | 10/1995 | Tanaka | |
| 6,008,297 A | 12/1999 | Tanaka et al. | |
| 6,075,116 A * | 6/2000 | Moriwaki | C08L 77/00 524/538 |

(Continued)

FOREIGN PATENT DOCUMENTS

| | | | | |
|---|---|---|---|---|
| CN | 102796371 A * | 11/2012 | | B29C 48/92 |
| EP | 0477027 A2 | 3/1992 | | |

(Continued)

OTHER PUBLICATIONS

Machine translation of CN 102796371 A, retrieved Apr. 2020 (Year: 2020).*

(Continued)

*Primary Examiner* — Nicole M. Buie-Hatcher (57) ABSTRACT

Disclosed herein are high performance semi-aromatic polyamide compounds having improved performance indicators for various applications, including alkaline battery end cap seal assembly applications. In one preferred embodiment, the disclosure relates to compounds comprising a semi-aromatic polyamide component comprising recurring terephthalamide and/or isophthalamide units, an impact modifier component comprising a modified polyolefin elastomer, one or more synergistic blends of sterically hindered phenolic stabilizers and phosphonates and one or more relatively high molecular weight organic phosphite stabilizers, and a fine talc nucleating agent.

15 Claims, 4 Drawing Sheets

(56) References Cited

U.S. PATENT DOCUMENTS

| | | | |
|---|---|---|---|
| 6,495,284 B2 | 12/2002 | Sargeant et al. | |
| 7,005,481 B1 * | 2/2006 | Lehmann | C08L 77/00 525/433 |
| 7,670,715 B2 | 3/2010 | Schubert | |
| 7,923,137 B2 | 4/2011 | Schubert et al. | |
| 8,252,458 B2 | 8/2012 | Schubert | |
| 9,090,739 B2 | 7/2015 | Ieda et al. | |
| 9,428,612 B2 | 8/2016 | Rulkens et al. | |
| 9,663,863 B2 * | 5/2017 | Takata | C08L 23/26 |
| 2005/0079413 A1 * | 4/2005 | Schubert | H01M 10/052 429/185 |
| 2010/0019210 A1 * | 1/2010 | Weber | C08L 2666/24 252/511 |
| 2010/0324195 A1 * | 12/2010 | Williamson | C08L 77/00 524/445 |
| 2011/0123749 A1 | 5/2011 | Hewel et al. | |
| 2013/0123439 A1 | 5/2013 | Mitadera et al. | |
| 2015/0065634 A1 * | 3/2015 | Pineau | B29D 99/0053 524/451 |
| 2015/0183991 A1 | 7/2015 | Yamamoto et al. | |
| 2015/0218374 A1 * | 8/2015 | Thomas | C08L 77/02 524/126 |
| 2015/0287493 A1 | 10/2015 | Aepli et al. | |
| 2016/0297120 A1 | 10/2016 | Lamberts et al. | |
| 2017/0037217 A1 | 2/2017 | Taketani et al. | |
| 2019/0127536 A1 * | 5/2019 | Bandi | C08L 77/06 |

FOREIGN PATENT DOCUMENTS

| | | | |
|---|---|---|---|
| JP | 2005078890 A | * | 3/2005 |
| JP | 2016164430 A | | 8/2016 |

OTHER PUBLICATIONS

Machine translation of JP 2005078890 A, retrieved Apr. 2020 (Year: 2020).*

International Search Report and Written Opinion dated Feb. 14, 2019 for Corresponding PCT/US18/63444.

Data Sheet for NHU-PPA Resin, New Harmony Union.

Shi, Ying, "Phase Behavior of Polyamide 6/612 Blends", Plastics Engineering (Apr. 2016).

* cited by examiner

HIGH PERFORMANCE POLYAMIDE COMPOUNDS AND USES THEREOF

This application claims the benefit of priority to U.S. Provisional Application No. 62/595,000, filed Dec. 5, 2017, which is incorporated herein by reference in its entirety.

TECHNICAL FIELD

The present disclosure relates to semi-aromatic polyamide compounds having improved performance indicators for various applications, including alkaline battery end cap seal assembly applications.

BACKGROUND

Aliphatic polyamides (nylons) are melt processable thermoplastics having a good combination of properties for use in various applications. For example, they possess as a class, and on a relative basis, high mechanical strength, low wear and abrasion, good thermal properties, and good chemical resistance. However, for certain applications, aliphatic polyamides may be considered to have relatively low impact strength, for example.

Semi-aromatic polyamides, sometimes referred to as high temperature polyamides, are thermoplastics also having a good range of properties for certain applications. For example, they possess as a class, and on a relative basis in relation to aliphatic polyamides, improved thermal properties, and increased chemical resistance, but may also be considered to have relatively low impact strength and low processability due to high melt temperatures for certain applications, for example.

The materials need to be able to be able to withstand manufacturing processes, such as injection molding, that expose the composition to elevated heat profiles, and exhibit good cycle times.

Accordingly, there is a need for semi-aromatic compounds exhibiting good processability and good impact resistance for use in applications such as, e.g., alkaline battery end cap seal assembly applications.

BRIEF DESCRIPTION OF THE DRAWINGS

The features, aspects, and advantages of the present invention will become better understood with regard to the following description, appended claims, and accompanying drawing(s) where:

BRIEF SUMMARY

The present disclosure sets forth embodiments of a novel semi-aromatic polyamide composition and formed articles obtained by forming the novel semi-aromatic polyamide resin composition. The semi-aromatic polyamide resin composition comprises (by weight): 90 to 70% of at least one semi-aromatic polyamide, 5 to 25% of at least one modified polyolefin elastomer, 0.2 to 2% of a first and second heat stabilizers, and 0.1 to 2% of a nucleating agent, wherein the at least one semi-aromatic polyamide has a melt temperature from 305° C. to about 343° C. and a glass transition temperature from 90° C. to 130° C., wherein the first heat stabilizer comprises one or more sterically hindered phenolic stabilizers, alkyl phosphonate stabilizers, or metal salt and halide stabilizers, or combinations thereof, and wherein the second heat stabilizer comprises one or more sterically hindered phenolic stabilizers, organic phosphite stabilizers, or combinations thereof, and wherein the ratio of the first heat stabilizer to the second heat stabilizer is from about 2.5:1 to about 1:1. More preferably, in some embodiments the composition comprises (by weight): 90 to 77% of at least one semi-aromatic polyamide, 8 to 20% of at least one modified polyolefin elastomer, 0.3 to 1.5% of first and second heat stabilizers, and 0.1 to 1 weight percent nucleating agent, and wherein the ratio of the first heat stabilizer to the second heat stabilizer is from about 2:1 to about 1.25:1. Even more preferably, in some embodiments the composition comprises (by weight): 84 to 83% of at least one semi-aromatic polyamide, 14.2 to 15.8% of at least one modified polyolefin elastomer, 0.4 to 1.0 weight percent of first and second heat stabilizers, and 0.1 to 1 weight percent nucleating agent, and wherein the ratio of the first heat stabilizer to the second heat stabilizer is from about 1.67:1 to about 1.5:1.

In one or more embodiments, the semi aromatic polyamide comprises repeating units:

wherein R comprises an aliphatic radical having 4 to about 14 carbon atoms and the mole ratio of the units 1 and 2 ranges from about 0-100:0-100.

In several embodiments, the modified polyolefin elastomer is a maleic-anhydride-modified olefin copolymer. In other embodiments, the first heat stabilizer comprises one or more synergistic blends of sterically hindered phenolic stabilizers and phosphonates and the second heat stabilizer generally comprises one or more relatively high molecular weight organic phosphite stabilizers, and the nucleating agent is a fine talc having an average particle diameter that does not exceed about 5 µm. In other embodiments, the first heat stabilizer comprises one or more synergistic blends of sterically hindered phenolic stabilizers and phosphonates, and the second heat stabilizer comprises bis (2,4-dicumylphenyl) pentaerythritol diphosphate, and the nucleating agent is a fine talc having an average particle diameter that does not exceed 1.5 µm.

In one or more embodiments, the formed article is a battery end cap seal assembly.

DETAILED DESCRIPTION

It should be noted that in the detailed descriptions that follow, identical components have the same reference numerals, regardless of whether they are shown in different embodiments of the present disclosure. It should also be noted that for purposes of clarity and conciseness, the drawings may not necessarily be to scale and certain features of the disclosure may be shown in somewhat schematic form.

Parts are parts by weight and percent is weight percent, calculated from the total of the composition major components (semi-aromatic polyamide, modified polyolefin elastomer, first and second stabilizers, and nucleating agent as referenced below), unless otherwise indicated or apparent.

As used herein, the terms "compound" and "composition" shall mean a composition (whether in powdered, granular, or pelletized, etc. form) comprising a mixture/blend of two or more components that is used to simplify forming a product comprising the two components, rather than forming the product from the individual components. In addition, as used herein, the term encompasses both "concentrated" compositions (sometimes referenced as masterbatches), which are formulated to be mixed/blended with one or more diluting components during the formation of a polymer product, and "fully" compounded compositions, which are not formulated to be mixed/blended with such diluents.

As used herein, the term "copolymer" generally means any polymer comprising two or more different monomers, where "different" means differing by at least one atom, such as the number of carbons, unless usage context dictates otherwise.

As used herein, the term "polymer blend" and similar terms shall mean a composition containing two or more polymers, which may or may not be miscible. Blends are not laminates, but one or more layers of a laminate may contain a blend.

The present disclosure is directed to semi-aromatic polyamide compounds comprising one or more semi-aromatic polyamides, at least one functionalized polyolefin elastomer, and one or more additives to improve manufacturability, including but not limited to one or more heat stabilizers and nucleating agents. The composition may also include additives such as slip agents and fillers, etc.

The semi-aromatic polyamides in the compounds disclosed herein comprise polymers having units derived from one or more aliphatic diamines (A-A units) and units derived from one or more dicarboxylic acids (B-B units), where A and B represent NH2 and COOH functional groups, respectively, and wherein at least 50 mole percent of the units derived from dicarboxylic acids (B-B units) are derived from an aromatic dicarboxylic acid.

In general, any suitable AABB semi-aromatic polyamide sufficient to perform in the application of interest may be used herein. Suitable AABB semi-aromatic polyamides include polyamides having an A-A unit derived from a C4-C12 aliphatic diamine and an aromatic B-B unit derived from terephthalic and/or isophthalic acid. In some embodiments, the A-A unit is derived from an aliphatic diamine having 6 to 11 carbon atoms, such as being mainly composed of 1,6 hexanediamine or 1,8-octanediamine, with 1,6 hexanediamine being more suitable. In one or more especially suitable embodiments, at least 50 mole percent of the B-B unit is derived from terephthalic and/or isophthalic dicarboxylic acid, and any remaining mole percent of the B-B unit is derived from an aliphatic dicarboxylic acid.

In the embodiments described herein, the semi-aromatic polyamide should have a melt temperature of at least about 300° C., and preferably between about 305 to about 343° C. and more preferably about 308° C., and a glass transition temperature between about 90 to about 130° C., and more preferably about 95 to about 110° C., measured according to ISO 11357-1:2016.

In addition to one or more semi-aromatic polyamides, the compositions disclosed herein include one or more components to increase impact strength, comprising one or more functionalized polyolefin elastomers. In general, the impact modifier may be any suitable functionalized polyolefin elastomer, and in some embodiments comprises one or more functionalized random copolymers of ethylene and an alpha-olefin having 3 to 10 carbon atoms. In one or more embodiments, the modified polyolefin elastomer is obtained by modifying a random copolymer of ethylene and an alpha-olefin having 3 to 10 carbon atoms with an unsaturated carboxylic acid, such as acrylic acid, methacrylic acid, maleic acid, maleic anhydride, fumaric acid or itaconic acid. Combinations of different types of chemically modified polyolefin elastomers may also be used. Particularly suitable is a random copolymer of ethylene and propylene that is graft-modified with a maleic acid or a maleic anhydride. Examples of suitable commercially available functionalized polyolefin elastomers are Bondyram® 7107 from Polyram Group, Fusabond N493 from Dupont, Tafmer MD715 from Mistui Chemical, and Exxelor VA1803 from ExxonMobil.

The compositions disclosed herein comprise one or more additives to improve manufacturability. Manufacturability generally relates to a composition's ability to maintain desired product characteristics after having been exposed to manufacturing processes having elevated heat profiles (e.g., injection molding), and a composition's ability to exhibit favorable characteristics during manufacturing. With respect to the latter, and when the manufacturing process is injection molding, a favorable characteristic includes fast cycle time (the characteristic of the composition to provide for reduced time of processing steps in an injection molding cycle).

In one or more embodiments, the manufacturing additives comprise at least a first and second heat stabilizer package and at least one suitable nucleating agent. The first heat stabilizer package may generally comprise one or more sterically hindered phenolic stabilizers, alkyl phosphonate stabilizers, or metal salt and halide stabilizers, or combinations thereof. The second stabilizer package may generally comprise one or more sterically hindered phenolic stabilizers, organic phosphite stabilizers, or combinations thereof. In a preferred embodiment, the first stabilizer package generally comprises one or more synergistic blends of sterically hindered phenolic antioxidants and phosphonates and the second stabilizer package generally comprises relatively high molecular weight (greater than about 380 g/mol) organic phosphite stabilizers. In another preferred embodiment, the first stabilizer package comprises one or more synergistic blends of sterically hindered phenolic antioxidants and phosphonates, and the second stabilizer package comprises bis (2,4-dicumylphenyl) pentaerythritol diphosphate.

In one or more embodiments, the first and second heat stabilizer packages total from 0.2 to 2.0 weight percent. In one or more particularly suitable embodiments, the first and second heat stabilizer packages total from 0.3 to 1.5 weight percent; in another, from 0.4 to 1.0. In a more preferred embodiment, the first and second heat stabilizer packages total about 0.8 weight percent.

In one or more embodiments, the ratio of the first stabilizer package to the second stabilizer packages is from about 2.5:1 to about 1:1. In a more preferred embodiment, the ratio is from about 2:1 to about 1.25:1. In another preferred embodiment, the ratio is from about 1.67:1 to about 1.5:1. In another preferred embodiment, the ratio is about 1.67:1.

Non-limiting examples of commercially available heat stabilizers that are suitable for use herein may include Bruggolen® H3386 and H164 from Bruggemann Chemical, Irganox®1098 from BASF, and Doverphos® s-9228 from Dover Chemical. Mixtures of copper compounds such as Bruggolen® H320 from Bruggemann Chemical, Ultranox® 626 phosphite from Addivant, Songnox® 1680 from Songwon International. In a preferred embodiment, the first heat stabilizer package is Bruggolen® H164, and the second stabilizer package is Doverphos® S-9228.

The one or more nucleating agents may generally include any suitably fine and inert particulate nucleating agents, such as for example one or more clays, p-glass, silicates (including talcs), aromatic carboxylic acid salts, sodium benzoate etc. In one or more embodiments, the average diameter of the nucleating agent does not exceed about 5 µm; in other embodiments, the average diameter does not exceed about 1.5 µm; in others about 1 µm; and in still other embodiments, it does not exceed about 0.7 µm. In a particular embodiment, the one or more nucleating agents comprises talc having an average diameter that does not exceed about 5 µm; more suitably about 1.5 µm; even more suitably about 1 µm; and even more suitably about 0.7 m.

In order to effect sufficient nucleation that produces improved manufacturability, and in particular improved injection molding cycle time, the composition should have nucleating agent in an amount from 0.1 to 2 weight percent. In one or more preferred embodiments, the composition comprises about 0.1 to 1 weight percent nucleating agent. In an even more preferred embodiment, the composition comprises about 0.5 weight percent nucleating agent.

Non-limiting examples of commercially available nucleating agents that are suitable for use herein may include HTP Ultra 5L, Bruggolen® P22 from Bruggemann Chemical, Licomont® CaV102 from Clariant, Crys-Talc®, Jetfine® from Imerys and NA-05 from Amfine Chemical Corporation. In a particularly advantageous embodiment, the commercially available nucleating agent is HTP Ultra 5L.

One or more additional additives, generally known by those having skill in the art, may be added to help improve one or more characteristics, in such amounts so as not to impair the desired functionality of the composition. Such additives may include, for example, one or more slip agents and fillers, etc. Slip agents may include, for example, organic amide slip agents. Fillers may include, for example, inorganic fillers. Non-limiting examples of commercially available slip agents that are suitable include Crodamide 212 available from Croda.

Generally, the semi-aromatic polyamide compounds comprise from about 90 to about 70 weight percent semi-aromatic polyamide, from about 5 to about 25 weight percent modified polyolefin elastomer, and from about 0.3 to about 5 weight percent additives (first and second heat stabilizers and nucleating agent). More suitably, they comprise from about 90 to about 77 weight percent semi-aromatic polyamide, from about 8 to about 20 weight percent modified polyolefin elastomer, and from about 0.5 to about 3 weight percent additives. Even more preferably, from about 84 to about 83 weight percent semi-aromatic polyamide, from about 14.2 to about 15.8 weight percent modified polyolefin elastomer, and from about 1.0 to about 1.8 weight percent additives.

Battery Seal Application

Figures 1A, 1B:
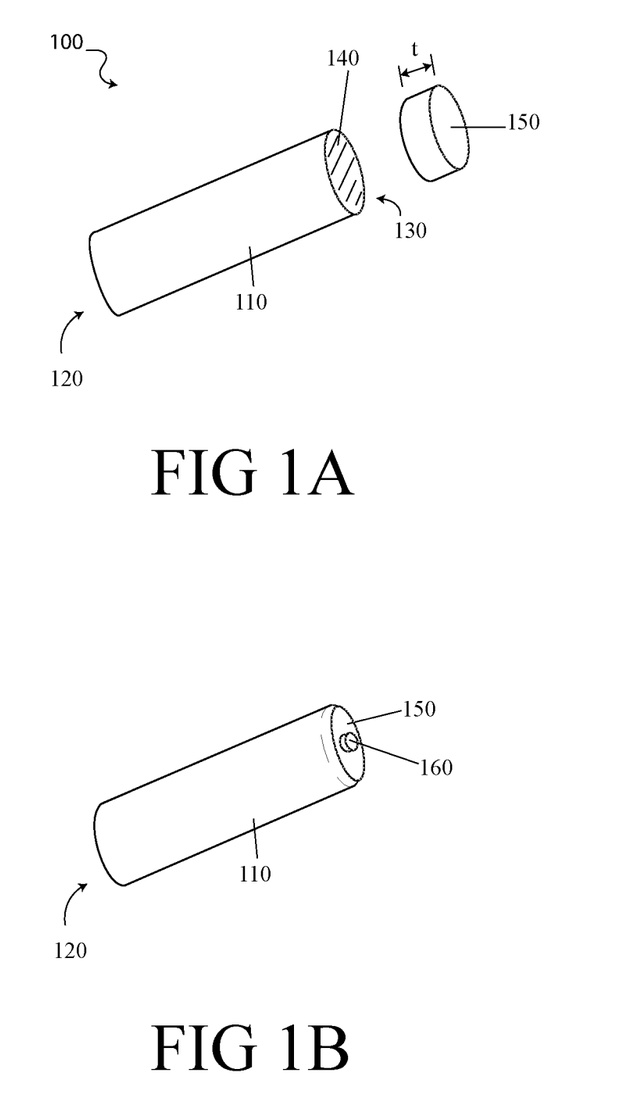
FIG. 1A shows a partially exploded isometric view of an exemplary small diameter alkaline cell having an end cap seal assembly formed from the compound disclosed herein.
FIG. 1B shows an unexploded isometric view of the exemplary small diameter alkaline cell having an end cap seal assembly shown in FIG. 1A.

One exemplary use of the semi-aromatic polyamide resin compositions disclosed herein is in forming an end cap seal assembly for a small diameter cylindrical alkaline electrochemical cell (battery). As illustrated in FIG. 1A, a small diameter cylindrical alkaline electrochemical cell 100 may comprise a cylindrical casing (housing) 110 with a closed end 120 and an open end 130, wherein the casing defines an interior volume 140 for holding electrochemical materials (wet or dry) and any related materials, such as current collectors, etc. (not shown). However, this disclosure is in no way limited to any particular electrochemical material used in the cell 100; the housing 110 and the other components of the cell 100 being compatible with any such material chemistries. End cap seal assembly 150 is composed of a semi-aromatic polyamide resin composition of this disclosure and generally comprises a cover piece, which is secured to open end 130, such as by welding, crimping or other mechanical means. The cover piece closes the open end 130 and provides a seal against the egress of electrochemical materials contained in volume 140. The dimensions of seal assembly 150 may vary according to the particular geometry selected for a particular electrochemical cell. With respect to cell 100, seal assembly 150 is formed in the shape of a circular disk having thickness t that is selected so as to provide sufficient mechanical and insulating properties. Note that in one or more embodiments, seal assembly 150 may bear other geometries and/or surface patterning to maximize properties (e.g., mechanical, thermal and/or dielectric properties). For example, in one or more embodiments (not shown) seal assembly 150 may bear circumferential patterning (e.g., ridges and/or annular ring) to provide a surface for casing 110 to be crimped against.

FIG. 1B is an unexploded view of cell 100 in an assembled state. In this embodiment, seal assembly 150 is shown seated within the walls of housing 110 at open end 130, which are crimped over a portion of the circumferential surface area of seal assembly 150 so as to provide a sufficient mechanical seal. Current collector 160 may be fitted therethrough to provide an anode.

The semi-aromatic polyamide resin compositions disclosed herein impart favorable characteristics to articles formed from it, such as the end cap seal assembly 150, for a number of reasons. Although not wishing to be bound by any particular theory, it is believed that improved impact strength (toughness) of the materials disclosed herein should provide better resistance to cracks, for example, and provide a better crimped mechanical seal with casing 110. Additionally, improved thermal characteristics of the materials disclosed herein should allow for less creep (and associated failures) and better processability of assembly 150. Similarly, improved chemical resistance should allow for longer usable life and less failure due to harmful interaction with the electrochemical materials contained within casing 110.

The embodiments of the semi-aromatic polyamide compositions described above may be produced in a continuous operation, a batch operation, or in a combined batch continuous operation.

In a continuous operation, the semi-aromatic polyamide, functionalized olefinic copolymer, manufacturing additives, and any other components (such as additional slip agents and fillers) may be fed into a continuous mixer, single or twin screw extruder via volumetric or gravimetric feeders. Inside the extruder, the components are mixed together and heated to a temperature that is sufficient to melt the polymers, such as between about 250° C. and 330° C. Extruder speeds can range from about 50 to about 1200 revolutions per minute (rpm) and more typically from about 300 to about 500 rpm. Gases from the extruder may be withdrawn by a vacuum pump. The output from the extruder is cooled (such as in a water bath or underwater granulator) and pelletized to form the compound.

In a batch operation, the semi-aromatic polyamide, functionalized olefinic copolymer, manufacturing additives, and any other components (such as slip agents and fillers) are added to a mixing device, such as a Banbury mixer, and are heated to a temperature that is sufficient to melt the polymers, such as between 250° C. and 330° C. The mixing speeds typically range from 300 to 500 rpm. The output from the mixer is cooled and pelletized to form the compound.

In a combined batch/continuous operation, the semi-aromatic polyamide, functionalized olefinic copolymer, manufacturing additives, and any other components (such as a slip agents and fillers) may be mixed together in a batch pre-mix operation and then fed into a single or twin screw extruder via a volumetric or gravimetric feeder. The mixing may be dry or may be performed in a heater-cooler mixing apparatus, wherein the components are first mixed at an elevated temperature in an upstream mixer and then mixed in a downstream mixer, where some of the heat is allowed to dissipate.

It should be appreciated that the semi-aromatic polyamide composition may be produced using equipment and operations other than those described above. For example, the composition may be produced using a continuous mixer or a kneader, such as a BUSS kneader.

EXAMPLES

The following examples are presented to further illustrate the embodiments disclosed and so as to provide those of ordinary skill in the art with a more complete disclosure and description of how the compositions claimed herein are made and evaluated. The following examples are not intended to limit the scope of the disclosed embodiments.

Materials

The following materials were used to prepare test compounds described below in Table 1: semi-aromatic polyamide resin available under the trade name N600 from Zhejiang NHU Special Materials Co., Ltd.; maleic anhydride modified ethylene-c-polyolefin available under the trade name Bondyram® 7107 from Polyram Group; an organic copper-complex based heat stabilizer available under the trade name Bruggolen® H3386 from Bruggemann Chemical; sterically hindered phenolic antioxidant-based heat stabilizer under the trade name Bruggolen® H164 from Bruggemann Chemical; aromatic amide antioxidant under the trade name Irganox® 1098 from BASF; diphosphite antioxidant under the trade name Doverphos® S-9228 from Dover Chemical Corporation; primary amide slip agent under the trade name Crodamide™ ER from Croda International; talc nucleating agent filler under the trade name HTP Ultra 5L.

The following materials were used to prepare comparative samples: nylon 6,6 resin available under the trade name Zytel® FG101 from DuPont; nylon 6,12 resin available under the trade name Zytel® FE3734 from DuPont.

Laboratory Scale Preparations

The semi-aromatic polyamide resin, maleic anhydride modified ethylene-α-polyolefin, and additives were mixed together in a tumble mixer at room temperature and then fed into a twin screw extruder via a gravimetric feeder and extruded at temperatures from 250 to 330° C. and screw speeds ranging from 300 to 500 rpm. The extrudate was pelletized and dried at 110° C. for four hours and thereafter formed into test samples by injection molding.

Analytical Methods

Melting and glass transition temperatures were measured using a differential scanning calorimetry (DSC) according to ISO 11357-3 (2011). Two heating and cooling cycles were performed on each sample with a speed of 10° C./min. The melting and glass transition temperature was determined from the second heating cycle.

Density was measured on an injection molded specimen using immersion method according to ISO 1183-1 (2012).

Tensile properties were performed following ISO 527-1 (2012) standard. The test specimen was pulled apart at a speed of 50 mm/min.

Flexural modulus values were obtained by conducting the three-point loading test according to ISO 178 (2010). The test specimen was mounted on a span of 64 mm and deformed at 2 mm/min.

Izod impact strength (notched) were carried out according to ISO 180 (2000) standard. The specimen was notched prior to testing. The depth under the notch of the specimen is 8 mm. It was clamped onto the impact test fixture with the notched side facing the striking edge of the pendulum. The pendulum was release and allowed to strike through the specimen.

Mold Shrinkage (normal and parallel) was conducted according to ISO 294-4 (2001) standard method. The mold cavity's dimension was 5"×7"×0.125" (128×178×3.2 mm). The dimension of the injection molded plaque was measured 48 hours after molding. The mold shrinkage values were calculated by comparing the dimension of the mold cavity and the molded plaque.

Inherent viscosity was analyzed by dissolving the polymer in 96% sulfuric acid and measuring viscosity using a solution viscometer according to ISO 307 (2007).

Water absorption was analyzed by placing the test specimen in an environmental chamber at 70±1° C. and 62±1% humidity for 7 days, and measuring the moisture level of the specimen using a moisture analyzer following ISO 62 (2008) procedures.

Coefficient of linear thermal expansion was analyzed by using a thermomechanical analyzer (TMA) using a heating rate of 5° C./min and purge gas of nitrogen according to ISO 11359-2 (1999).

Specific heat was analyzed using a differential scanning calorimetry (DSC) with a heating rate of 3° C./min and a sapphire sample was used to calibrate the base line according to ISO 11357-4 (2014).

Melt viscosity was measured using a capillary rheometer following ISO 11443 (2014) standard. The material was dried under vacuum at 100° C. until the moisture is less than 0.05%. The test was carried out at 285° C.

Samples and Test Results

Test samples 1 and 2 were formulated as stated in Table 1 and test results were observed as stated in Table 2, below.

TABLE 1

| | SAMPLE 1 | | | SAMPLE 2 | |
|---|---|---|---|---|---|
| (a) | N600 (PPA) | 83.70% | (a) | N600 (PPA) | 83.40% |
| (b) | Bondyram 7107 | 15% | (b) | Bondyram 7107 | 15% |
| (c)(1) | Bruggolen H3386 | 0.30% | (c)(1) | Bruggolen H164 | 0.50% |
| (c)(2) | IRGANOX 1098 (A-99116) | 0.20% | (c)(2) | S9228 | 0.30% |

TABLE 1-continued

| | SAMPLE 1 | | | SAMPLE 2 | |
|---|---|---|---|---|---|
| (d) | HTP ULTRA 5L | 0.50% | (d) | HTP ULTRA 5L | 0.50% |
| | CRODAMIDE 212-BE (HU) | 0.30% | | CRODAMIDE 212-BE (HU) | 0.30% |

TABLE 2

| Test | Units | Nylon 66 | Nylon 612 | Sample 1 | Sample 2 |
|---|---|---|---|---|---|
| Melting Temperature | °C. | 262 | 250 | 297 | 293 |
| Density | g/cm3 | 1.14 | 1.07 | 1.13 | 1.14 |
| Yield Stress, 50 mm/min @23 C.; DAM | MPa | 82 | 58.6-66.6 | 65.6 | 72 |
| Yield Stress, 50 mm/min @23 C.; conditioned | | | | 48.6 | 58.5 |
| Flexural Modulus | MPa | 2800 | 2200 | 2341 | 2765 |
| Izod Impact Strength, notched @23 C. | KJ/m2 | 6 | 4.8 | 14.8 | 13.6 |
| Shrinkage normal (%) | | 1.00 | 1.1 | 2.47% | 1.45% |
| Shrinkage parallel (%) | | 2.00 | 1.3 | 1.90% | 1.28% |
| Inherent viscosity (cm3/g) | | | 0.92-1.03 | 0.92 | |
| Water absorption | | 2.6-8.5 | 1.3-3.0% | 1.90% | 2.10% |
| Glass transition temperature | °C. | 60 | 46 | 89 | 76 |
| Coefficient of linear thermal expansion | 1/°C. | 1.00E−04 | 1.10E−04 | 1.40E−04 | 1.61E−04 |
| Specific heat | J/kg/°C. | 2790 | 1880 | 2263 | 1662 |

Reviewing Table 2, it is apparent that the material in samples 1 and 2 has increased impact strength balanced by good tensile stress, which may help cause an end cap fashioned from it be resistant to cracking during the lifetime of a battery. It has high melting and glass transition temperatures, which may help cause an end cap fashioned from the material prevent leakage when a battery cell is subjected to extremes in hot and cold climate. In addition, the material has good dimensional stability and absorbs less water than aliphatic polyamides, including nylon 66 and nylon 612. Its maintains good mechanical properties after the material has been conditioned (absorbs water and reaches equilibrium). Being comprised of a polyamide may help cause an end cap fashioned from it to exhibit relatively small creep at all temperatures to which a battery cell may be exposed during normal operation than other, traditional end-cap material, such as filled or unfilled polypropylene. Finally, the material shrinks similarly to aliphatic polyamides, such as nylon 66 and nylon 612, and has similar thermal characteristics (coefficient of thermal expansion, specific heat capacity), which allows the material to be processed the same way as aliphatic polyamides.

Figure 2:
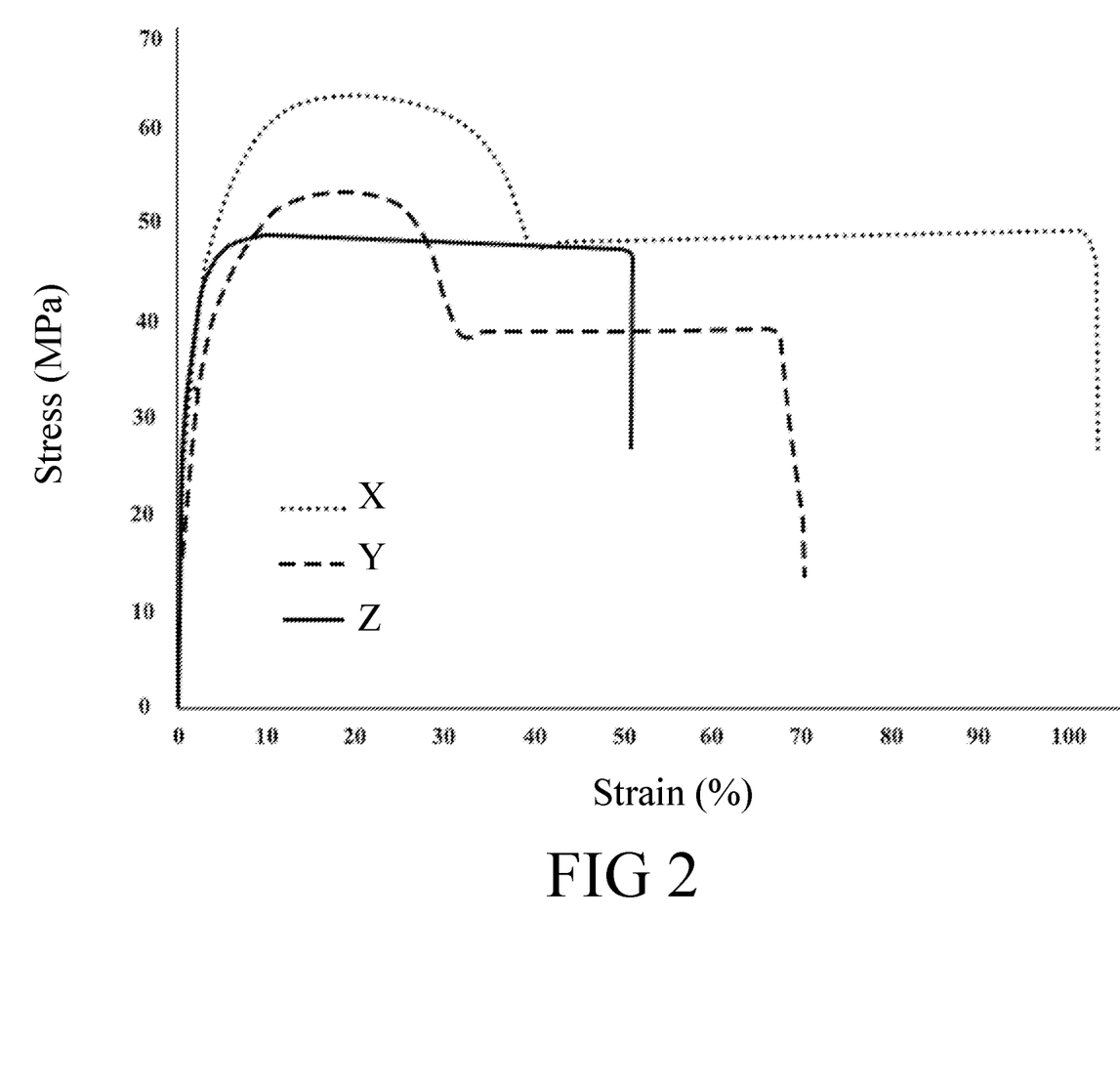
FIG. 2 shows a characteristic stress/strain curve of a preferred embodiment.

With reference to FIG. 2, a representative stress/strain curve for Sample 2 (labeled "Z") is shown, plotted against curves for nylon 66 (labeled "X") and nylon 612 (labeled "Y") after conditioning, wherein water absorption had reached equilibrium. With reference to FIG. 2, it is apparent that the Sample 2 material has lower tensile stress than both aliphatic polyamides but slightly higher Young's modulus. The elongation at break of the Sample 2 material is less than both aliphatic polyamides, which indicates less water absorption. This is desirable because an end cap fashioned from material having relatively high elongation at break may result in a greater probability of battery cell explosions from gas buildup in the cell, rather than a controlled rupture and release of the gases.

Aliphatic polyamides are traditionally heat-stabilized using copper-complex based antioxidants, and it is noted that Sample 1 contains a copper-complex-based antioxidant heat stabilizer package (Bruggolen H3386), together with a sterically hindered phenolic antioxidant (Irgonox 1098). Such packages are intended to enable the compound to survive long term heat aging and maintain good mechanical properties after heat aging. The sterically hindered phenolic antioxidant in this package serves as a processing stabilizer-a stabilizer intended to account for the heat of processing the material.

Because it is desirable in many manufacturing processes to utilize regrind material (e.g., first generation and/or multiple generations of injection molded material that is "reground" or grinded into granulate and added to virgin sample), it is noted that any samples containing such regrind material will have been subjected to additional processing heat as compared with a virgin sample, since the regrind content of the sample will have been previously heat processed (e.g. injection molded). Accordingly, Sample 2 was developed with a non-traditional stabilizer package in part to address this. The heat stabilizer package in Sample 2 contains a synergistic blend of sterically hindered phenolic antioxidants and phosphonate (Bruggolen H164), and a high molecular weight alkyl phosphite antioxidant (S-9228).

Without wishing to be bound by theory, it is believed that the use of alkyl phosphate and/or phosphite stabilizers provides better heat stability generally in semi-aromatic polyamides than metal complexed stabilizers.

Figure 3:
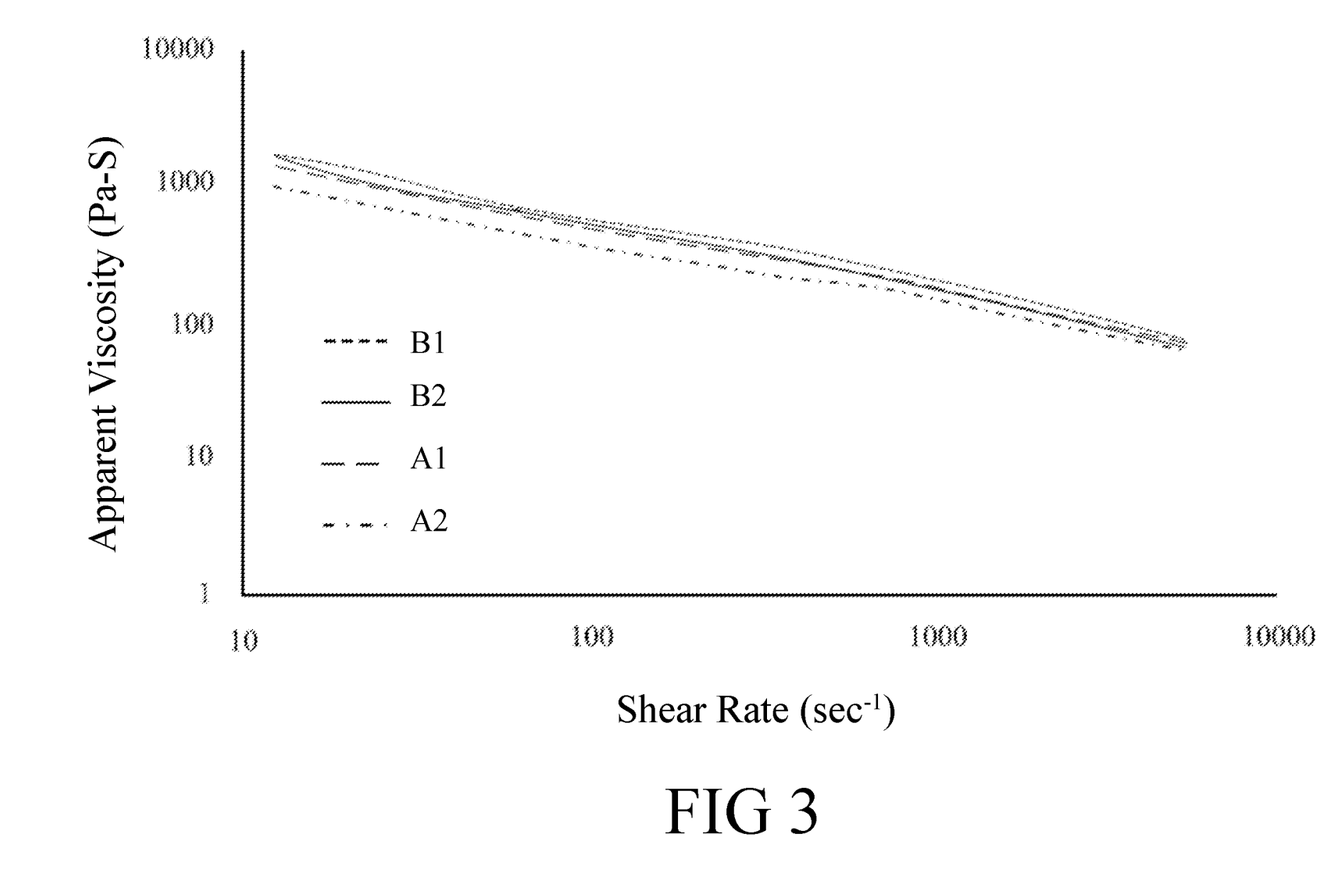
FIG. 3 shows a plot of apparent viscosity for samples with and without regrind material content.

With reference to FIG. 3, apparent viscosity was measured and plotted for Samples 1 and 2 using virgin material (labeled "A1" and "B1", respectively) and samples having about 45 weight percent of regrind material (labeled "A2" and "B2", respectively), thereby demonstrating the relative impact of regrind material on the melt viscosity of Samples 1 and 2. As shown in FIG. 3, Sample 2 showed minimal viscosity change when regrind material was added, as compared to Sample 1. This is unexpected because Sample 2 contains an unconventional heat stabilizer package for polyamide compounds. For example, high molecular weight phosphite antioxidants (e.g., Doverphos S-9228) are typically used in polypropylene compounds, and not polyamide compounds. The relatively minimal change in viscosity exhibited for Sample 2 suggests that Sample 2 has improved manufacturability than Sample 1, when considering the use of regrind material.

With reference to Table 3, mechanical properties were measured and plotted for Samples 1 and 2 using virgin material and samples having about 45 weight percent of regrind material, thereby demonstrating the relative impact of regrind material on these mechanical properties. As shown by the data, Sample 2 loses much less impact and tensile strength after incorporating regrind material as compared with Sample 1. This is unexpected because regrind material is material that has been injection molded at least once-a process that causes polymer chains to lose integrity (e.g., chain length and entanglement) and thus exhibit significantly reduced mechanical properties, including impact resistance, which is related to chain length and entanglement. Sample 2 with regrind material appears to have maintained polymer chain length during injection molding and therefore showed much less reduction of Izod impact.

TABLE 3

| Physical Property | Units | Sample 1 virgin | Sample 1 w/regrind | Sample 2 virgin | Sample 2 w/regrind |
|---|---|---|---|---|---|
| Notched Izod Impact | Kj/m2 | 13.6 | 4.3 | 16.3 | 14.6 |
| Tensile Strength at yield | MPa | 72 | 67.6 | 66.3 | 62.9 |
| Elongation at break | % | 3.29 | 3.94 | 7.62 | 12 |

The ability to maintain impact and tensile strength when regrind material is added to a sample should improve manufacturability of the composition, as many injection molding processes utilize regrind material.

In addition, a small amount of fine talc (HTP Ultra 5L) was utilized in the samples as a nucleating agent to further improve manufacturability (e.g., injection molding characteristics). In general, the talc is expected to increase the crystallization rate and temperature and allow for the polymer melt to solidify quickly enough to accommodate a relatively fast manufacture cycle time.

Figure 4:
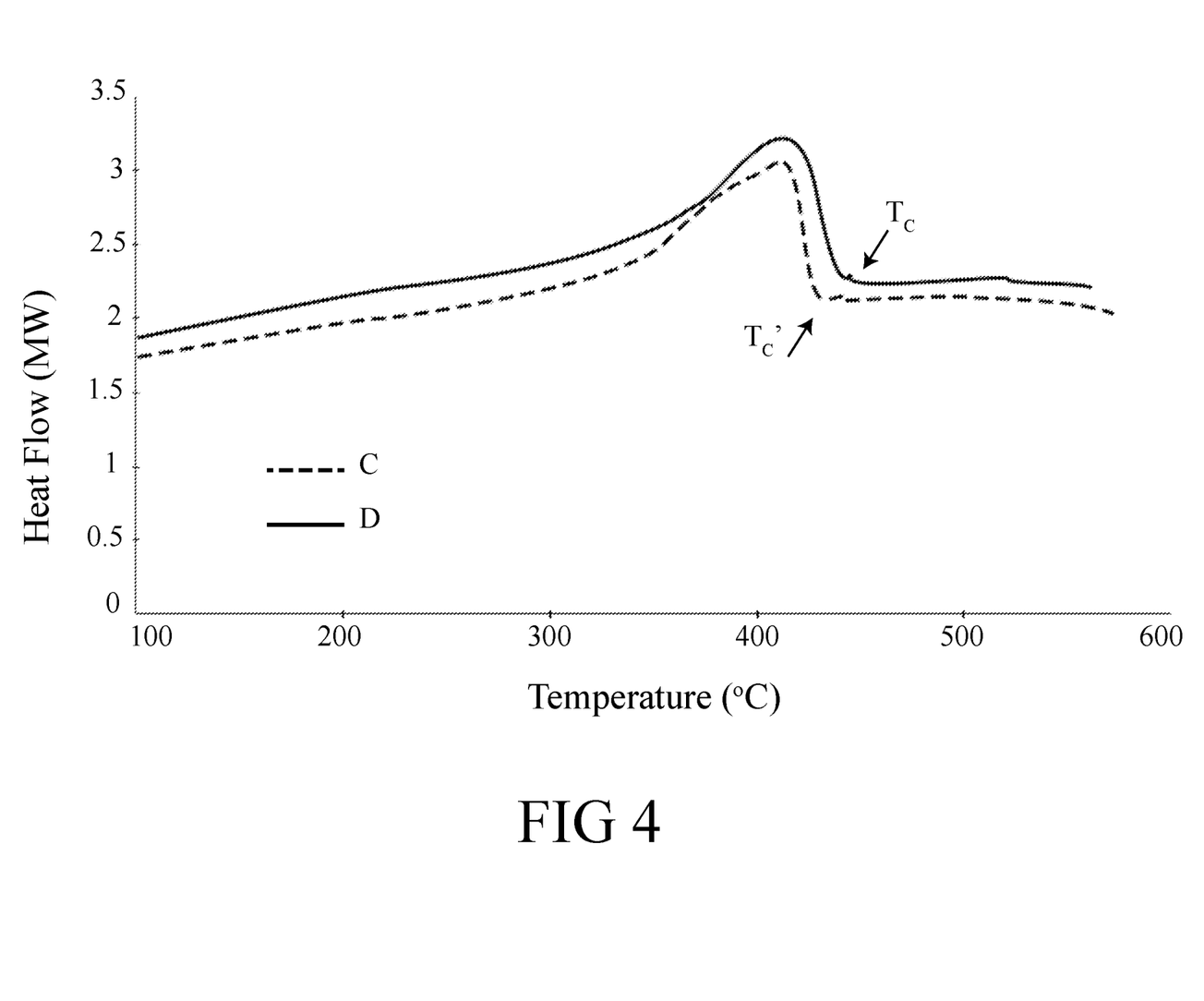
FIG. 4 shows a plot of DSC data for samples with and without a talc nucleating agent.

With reference to FIG. 4, differential scanning calorimetry was performed and the data plotted for two samples— Sample "C" consisted of Sample 2 formulation, but without talc added. Sample "D" consisted of Sample 2 formulation, including the talc loading shown in Table 1. As seen in FIG. 4, the onset of crystallization temperature of Sample C was increased from 266° C. (indicated by Tc' in FIG. 4) to 273° C. (indicated by Tc in FIG. 4) by adding the small amount (0.5%) of fine talc present in Sample 2. A higher crystallization temperature should allow for faster cycle times in various manufacturing processes, including injection molding.

Qualitatively, as described above in relation to Table 2, Sample 2 shrinks similarly to aliphatic polyamides, such as nylon 66 and nylon 612, suggesting that Sample 2 (having fine talc added) should exhibit molding characteristics similar to those of nylon 66 and nylon 612.

It will be understood that any one or more feature or component of one embodiment described herein can be combined with one or more other features or components of another embodiment. Thus, the present disclosure includes any and all combinations of components or features of the embodiments described herein.

As described hereinabove, the present disclosure solves many problems associated with previous materials, methods, and applications. However, it will be appreciated that various changes in the details, materials and components, which have been herein described and illustrated in order to explain the nature of the disclosed embodiments, may be made by those skilled in the art without departing from the principle and scope hereof, as expressed in the appended claims.

What is claimed is:

1. A formed article obtained by forming a semi-aromatic polyamide resin composition comprising:
   90 to 70 weight percent of at least one semi-aromatic polyamide;
   5 to 25 weight percent of at least one modified polyolefin elastomer;
   0.2 to 2 weight percent of a first heat stabilizer and a second heat stabilizer; and
   0.1 to 2 weight percent of a nucleating agent,
   wherein the at least one semi-aromatic polyamide has a melt temperature from 305° C. to about 343° C. and a glass transition temperature from 90° C. to 130° C.,
   wherein the ratio of the first heat stabilizer to the second heat stabilizer is from about 2.5:1 to about 1:1,
   wherein the first heat stabilizer comprises one or more blends of sterically hindered phenolic stabilizers and phosphonates,
   wherein the second heat stabilizer comprises bis (2,4-dicumylphenyl) pentaerythritol diphosphate, and
   wherein the nucleating agent is a fine talc having an average particle diameter that does not exceed 1.5 µm.

2. The formed article of claim 1 wherein the semi-aromatic polyamide resin composition comprises 90 to 77 weight percent of at least one semi-aromatic polyamide, 8 to 20 weight percent of at least one modified polyolefin elastomer, 0.3 to 1.5 weight percent of first and second heat stabilizers, and 0.1 to 1 weight percent nucleating agent, and wherein the ratio of the first heat stabilizer to the second heat stabilizer is from about 2:1 to about 1.25:1.

3. The formed article according to claim 2 wherein the semi-aromatic polyamide resin composition comprises 84 to 83 weight percent of at least one semi-aromatic polyamide, 14.2 to 15.8 weight percent of at least one modified polyolefin elastomer, 0.4 to 1.0 weight percent of first and second heat stabilizers, and 0.1 to 1 weight percent nucleating agent, and wherein the ratio of the first heat stabilizer to the second heat stabilizer is from about 1.67:1 to about 1.5:1.

4. The formed article according to claim 2 wherein the semi-aromatic polyamide comprises repeating units:

(1)

(2)

wherein R comprises an aliphatic radical having 4 to about 14 carbon atoms and the mole ratio of the units 1 and 2 ranges from about 0-100:0-100.

5. The formed article according to claim 2 wherein the modified polyolefin elastomer is a maleic-andydride-modified olefin copolymer.

6. A battery end cap seal assembly obtained by forming a semi-aromatic polyamide resin composition comprising:
   90 to 70 weight percent of at least one semi-aromatic polyamide;

5 to 25 weight percent of at least one modified polyolefin elastomer;
0.2 to 2 weight percent of a first heat stabilizer and a second heat stabilizer; and
0.1 to 2 weight percent of a nucleating agent,
wherein the at least one semi-aromatic polyamide has a melt temperature from 305° C. to about 343° C. and a glass transition temperature from 90° C. to 130° C.,
wherein the ratio of the first heat stabilizer to the second heat stabilizer is from about 2.5:1 to about 1:1,
wherein the first heat stabilizer comprises one or more blends of sterically hindered phenolic stabilizers and phosphonates,
wherein the second heat stabilizer comprises bis (2,4-dicumylphenyl) pentaerythritol diphosphate, and
wherein the nucleating agent is a fine talc having an average particle diameter that does not exceed 1.5 μm.

7. The battery end cap seal assembly according to claim 6 wherein the semi-aromatic polyamide resin composition comprises 90 to 77 weight percent of at least one semi-aromatic polyamide, 8 to 20 weight percent of at least one modified polyolefin elastomer, 0.3 to 1.5 weight percent of first and second heat stabilizers, and 0.1 to 1 weight percent nucleating agent, and wherein the ratio of the first heat stabilizer to the second heat stabilizer is from about 2:1 to about 1.25:1.

8. The battery end cap seal assembly according to claim 7 wherein the semi-aromatic polyamide resin composition comprises 84 to 83 weight percent of at least one semi-aromatic polyamide, 14.2 to 15.8 weight percent of at least one modified polyolefin elastomer, 0.4 to 1.0 weight percent of first and second heat stabilizers, and 0.1 to 1 weight percent nucleating agent, and wherein the ratio of the first heat stabilizer to the second heat stabilizer is from about 1.67:1 to about 1.5:1.

9. The battery end cap seal assembly according to claim 7 wherein the semi-aromatic polyamide comprises repeating units:

wherein R comprises an aliphatic radical having 4 to about 14 carbon atoms and the mole ratio of the units 1 and 2 ranges from about 0-100:0-100.

10. The battery end cap seal assembly according to claim 7 wherein the modified polyolefin elastomer is a maleic-anhydride-modified olefin copolymer.

11. A semi-aromatic polyamide resin composition comprising:

90 to 70 weight percent of at least one semi-aromatic polyamide;
5 to 25 weight percent of at least one impact-modified polyolefin elastomer;
0.2 to 2 weight percent of a first heat stabilizer and a second heat stabilizer stabilizers; and
0.1 to 2 weight percent of a nucleating agent,
wherein the at least one semi-aromatic polyamide has a melt temperature from 305° C. to about 343° C. and a glass transition temperature from 90° C. to 130° C.,
wherein the ratio of the first heat stabilizer to the second heat stabilizer is from about 2.5:1 to about 1:1,
wherein the first heat stabilizer comprises one or more blends of sterically hindered phenolic stabilizers and phosphonates,
wherein the second heat stabilizer comprises bis (2,4-dicumylphenyl) pentaerythritol diphosphate, and
wherein the nucleating agent is a fine talc having an average particle diameter that does not exceed 1.5 μm.

12. The semi-aromatic polyamide composition of claim 11 comprising 90 to 77 weight percent of at least one semi-aromatic polyamide, 8 to 20 weight percent of at least one modified polyolefin elastomer, 0.3 to 1.5 weight percent of first and second heat stabilizers, and 0.1 to 1 weight percent nucleating agent, and wherein the ratio of the first heat stabilizer to the second heat stabilizer is from about 2:1 to about 1.25:1.

13. The semi-aromatic polyamide composition according to claim 12 comprising 84 to 83 weight percent of at least one semi-aromatic polyamide, 14.2 to 15.8 weight percent of at least one modified polyolefin elastomer, 0.4 to 1.0 weight percent of first and second heat stabilizers, and 0.1 to 1 weight percent nucleating agent, and wherein the ratio of the first heat stabilizer to the second heat stabilizer is from about 1.67:1 to about 1.5:1.

14. The semi-aromatic polyamide composition according to claim 12 wherein the semi-aromatic polyamide comprises repeating units:

wherein R comprises an aliphatic radical having 4 to about 14 carbon atoms and the mole ratio of the units 1 and 2 ranges from about 0-100:0-100.

15. The semi-aromatic polyamide composition according to claim 12 wherein the modified polyolefin elastomer is a maleic-anhydride-modified olefin copolymer.

* * * * *

UNITED STATES PATENT AND TRADEMARK OFFICE
CERTIFICATE OF CORRECTION

PATENT NO. : 10,854,859 B2
APPLICATION NO. : 16/206984
DATED : December 1, 2020
INVENTOR(S) : Shi It is certified that error appears in the above-identified patent and that said Letters Patent is hereby corrected as shown below:

In the Specification

In Column 5, Line 25, delete "m." and insert -- μm. --, therefor

In the Claims

In Column 14, Claim 11 Line 6, after "stabilizer" delete "stabilizers"

Signed and Sealed this
Third Day of January, 2023

Katherine Kelly Vidal
*Director of the United States Patent and Trademark Office*